Sept. 26, 1967   J. L. BRAB   3,343,954
ARTICLE AND PROCESS OF FORMING THE ARTICLE FROM POWDERED METAL
Filed Dec. 13, 1963   7 Sheets-Sheet 1

INVENTOR.
Joseph L. Brab.
BY Wood, Herron & Evans
ATTORNEYS.

Sept. 26, 1967 J. L. BRAB 3,343,954
ARTICLE AND PROCESS OF FORMING THE ARTICLE FROM POWDERED METAL
Filed Dec. 13, 1963 7 Sheets-Sheet 3

United States Patent Office 3,343,954
Patented Sept. 26, 1967

3,343,954
ARTICLE AND PROCESS OF FORMING THE
ARTICLE FROM POWDERED METAL
Joseph L. Brab, Cincinnati, Ohio, assignor to Porter Precision Products, Inc., Cincinnati, Ohio, a corporation of Ohio
Filed Dec. 13, 1963, Ser. No. 330,486
3 Claims. (Cl. 75—208)

This invention relates to the fabrication of metal parts, utilizing the powdered metal technique, and is directed particularly to the production of punch and die elements, which are mounted in a punch press for use in metal stamping operations. The invention also embraces the various punch and die elements which are fabricated by the present method.

The word "die element," as used throughout the specification and claims, is intended to designate both the punch which pierces the workpiece and also the die button which receives the shearing end of the punch during the punching stroke.

In the present disclosure, a punch retainer block has been selected to illustrate the features of the invention, although it will be apparent that the same principles may be utilized in the production of the punches, dies and other products which require a high degree of hardness and durability. Generally speaking, a retainer block comprises a unit formed of steel and accurately machined to provide bore holes adapting the block to receive one or more conventional punches which may be of the headed or headless type. The headed punch is held in the retainer block against withdrawal forces by the head itself; on the other hand, the headless type punch is locked in place by a spring-loaded ball which engages a slot formed in the shank portion of the punch, or by other commercial locking means.

In either type, the upper end of the punch is engaged by a mounting plate or by a backing plate seated against the ram of the press to withstand the compression forces which are developed during the punching stroke.

In addition to the punch mounting holes, the retainer block also includes bore holes arranged to receive screws which attach the punch retainer block to the mounting plate, which in turn, is attached to the ram of the punch press. The block also includes bore holes which interfit a plurality of dowel pins located in the mounting plate which is attached to the ram of the punch press. The dowel pins and their receiving bores are precisely located so as to position the retainer block (and its punch or punches) in accurate alignment with the die or dies which are mounted in a die retaining plate or pad.

The die or dies, in the present example, comprise hardened die buttons which are mounted in a die pad. The die pad, in turn, is mounted upon a stationary plate or platen, which is located immediately below the ram and punch retainer block, such that the end of each piercing punch is located in accurate alignment with the aperture of the die button. A typical die set, utilizing a retainer block for mounting the punch or punches is disclosed in Patent 3,103,845, issued to Walter G. Porter et al. A die pad or holder, which coacts with the retainer block and punch, is illustrated in Patent 2,865,452 also issued to Walter G. Porter.

In the past, the die retainer block, backing plate, punch, punch retainer block, die pad, and die button, have all been made from high grade steel which is machined to precise dimensions, and thereafter heat treated to impart the necessary physical properties, such as wear resistance, hardness and toughness.

One of the primary objectives of the present invention has been to provide a process for producing the several elements of a die set, utilizing the powdered metal process, such that, with the use of a suitable powdered metal composition, combined with proper compacting dies, various elements of a die set may be produced in a rapid efficient manner, with a minimum of machining operations and with physical characteristics similar to, or superior to, parts produced by conventional methods in the past.

As noted above, the present invention is illustrated particularly in relation to the fabrication of a retainer block which is utilized in mounting one or more dies with respect to the ram of a punch press. In general, the retainer block is fabricated from powdered metals comprising various compositions, as disclosed in greater detail in the specification. After the powdered metals are properly proportioned and mixed, the mixture is placed in a mold or matrix having an outline configuration corresponding to the required exterior shape of the retainer block. The matrix is mounted in a double acting compacting press having two shiftable rams acting against opposite sides of the matrix (which is stationary). One ram of the press includes cores or punches which delineate the location and the diameter of the required bores for mounting the punches, dowel pins, mounting screws and the like. The opposed shiftable ram includes apertures which interfit the cores or punches so as to delineate the counter bores and the like during the compression stroke.

During the compression stroke, which imparts, for example, a pressure of approximately 50 tons p.s.i., the powdered metal is subjected to a primary cold compacting treatment, that is, the powdered metal is placed in the mold in a cold state and compressed to a solid mass. As explained later, the powdered metal includes carbon, among other ingredients. The stroke of the rams is regulated to impart the required thickness to the retainer block; the amount of powdered metal is measured to provide the proper density.

Upon being compressed, the retainer block (or other part) is reduced substantially to its final shape, with the exception of certain machining operations which are performed later. After removal from the press, the compressed retainer block or briquette is advanced to a furnace having a protective atmosphere, such as hydrogen, helium or ammonia gas and is sintered in this atmosphere at a temperature of approximately 2200° F.

Another objective of the invention has been to provide a method or process of fabricating die elements (retainer blocks, punches and die buttons) from powdered metal in which the final product is infiltrated with copper and has substantially the same properties as conventional steel alloys, thereby to provide the necessary physical properties, such as hardness and toughness which are necessary properties in such die elements.

According to this aspect of the invention, the mixture of powdered metals includes a percentage of carbon which is degassed or dissipated during the sintering process. The carbon, which has an affinity with certain of the powdered components in the capacted structure, acts as a catalyst to assist in forming a homogeneous bond through chemical reaction under heat. During the sintering operation, the powdered metals, which form the alloy, are fused, while the carbon, which expands as it degasses and dissipates during the sintering process, leaves minute voids in the mass, which subsequently are infiltrated with copper zinc alloy which greatly strengthens the alloy.

A further objective of the invention has been to provide an arrangement whereby a substantially identical punch and die set, which is utilized in compacting the briquette or retainer block, is also utilized in compacting, from powdered copper, a copper slug and also a backup plate which forms a part of the die set, as explained later.

According to this aspect of the invention, the same matrix is utilized in delineating the outline configuration of the copper slug, which may be approximately ¼ the thickness of the retainer block; however, the stroke of the compacting press is increased to compact the powdered copper to the required thickness. The backing plate, as explained later in detail, is also formed from powdered metal which may be composed of the same or a similar mixture of powdered metals as the retainer block. In fabricating the backing plate, the stroke of the double acting press is also increased to provide the required thickness, the die set being altered slightly to provide the required hole pattern.

After having been sintered, the briquetted and sintered block is again placed in the furnace with the slug of copper resting upon its upper surface and having, preferably the same configuration as the retainer block. At this stage, the furnace is heated to a temperature of at least 1950° F., or slightly above the melting point of copper. During this process, the fused copper infiltrates the mass of the retainer block, from top to bottom.

Tests have shown that the infiltration of copper amounts to approximately 20% of the total mass of the block, due to the voids which are caused partially by dissipation of the carbon during the sintering process, and partially due to the inability to primary cold compact the briquette to 100% density in one operation. It is to be noted, that the copper completely infiltrates the entire mass of the retainer block during the infiltration treatment as pointed out later in detail with respect to the drawings.

After removal from the copper infiltrating furnace, the retainer block is advanced to a work hardening press where the block is acted upon by a die press imparting a high impact force to the cold block. This improves the accuracy of the various dimensions of the block and also imparts a surface hardness, however, this operation is not intended to, nor does it improve the internal physical properties.

After the work hardening, or brinelling operation above described, the retainer block is machined where necessary, that is, certain parts are drilled and tapped, and in some instances the bores are reamed to provide the required accuracy.

In the retainer block which is selected to illustrate the present invention, the punch is locked in place by a spring-loaded ball. The ball is confined in a bore which is inclined at an angle with respect to the bore in which the punch and the ball type punch locking elements are confined. This angular bore is delineated by a metal rod which is inserted into the matrix during the compacting operation. This rod is removed after the compacting operation thereby leaving an open bore hole to receive the retainer ball and its compression spring. This hole preferably is finished during the machining operation.

After a machining operation, the retainer block is carburized for approximately six hours in a furnace having a temperature of approximately 1800° F. in a protected atmosphere, after which the block is quenched in oil. The oil quenching forms an extremely hard case. Various methods are utilized in the carburizing procedure; however, in any method which is followed, carburizing provides an improved internal core having fine grain martensite and bainite structure leaving no traces of retained austenite.

The various features of this invention are more fully disclosed in relation to the following detailed description taken in conjunction with the drawings.

COMPACTING

Figure 1:
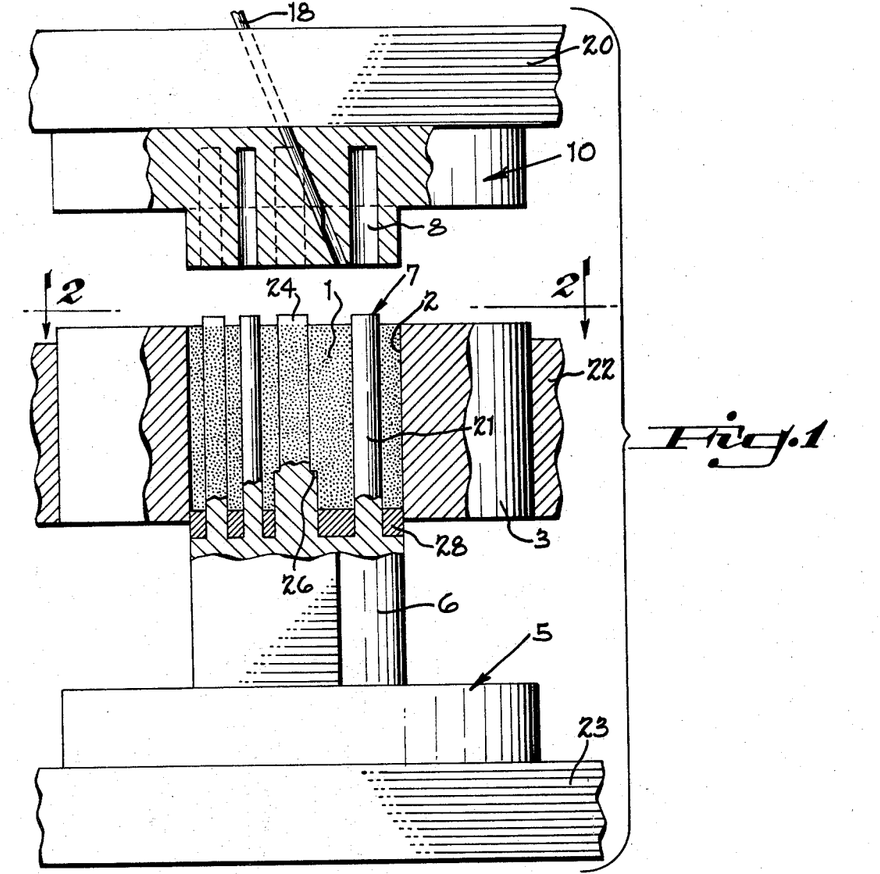
FIGURE 1 is a fragmentary side elevation, partly in cross section, showing the upper and lower punch assemblies mounted on the rams of a double action compression type press, and also showing the stationary matrix or holder in which the powdered metal is confined. In this view, the upper and lower die assemblies are shown in the retracted position for loading the powdered metal into the cavity of the holder.

Referring to FIGURE 1, the powdered metal, comprising, for example, a mixture of pulverized iron, copper, molybdenum, nickel, manganese, silicon and carbon, as indicated at 1, is fed into the matrix or die cavity, which is indicated at 2. As explained later, various other mixtures of powdered metals are utilized, depending upon the desired alloy and physical properties of the finished product. The die cavity is machined into a stationary die block or holder 3, the cavity being configurated to the external shape or the retainer block 4 (FIGURE 6), which is to be formed from the powdered metal.

At the start of the operation, the lower die assembly, indicated generally at 5 (FIGURE 1), resides in the lower portion of cavity 2 in order to support the powdered metal 1 as it is fed into the die cavity 2. The lower die assembly 5 includes a core element 6 and a stripper plate, as explained later, both of which are configurated to interfit the die cavity 2. In addition, the lower die assembly includes a series of male dies or pilots, indicated at 7, which are adapted to interfit a series of mating female die apertures 8 which form a part of the upper die assembly, indicated generally at 10.

Figure 15:
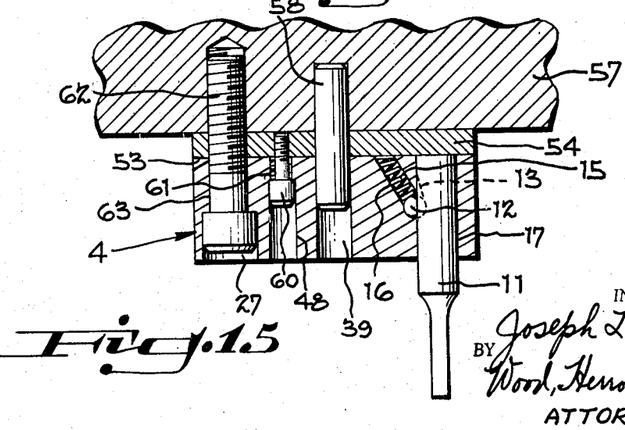
FIGURE 15 is a fragmentary sectional view showing the completed retainer block and backing plate installed in the ram of a die base, with a piercing punch installed in the holder or retainer.
Figure 16:
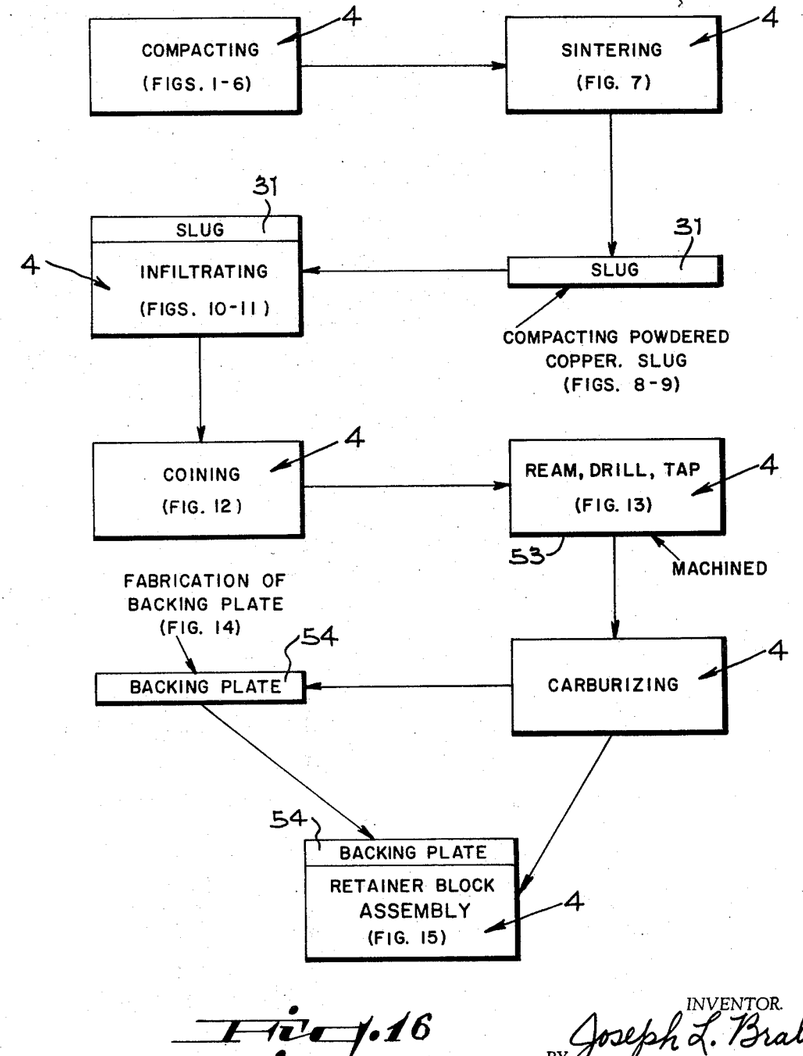
FIGURE 16 is a block diagram showing the successive steps taken during the fabrication of the block from powdered metal.

In the retainer block 4, which has been selected to illustrate the principles of this invention, a piercing punch 11, is locked in the retainer block 4 by a conventional spring-loaded ball 12, as illustrated in FIGURE 15. The spring-loaded ball 12 interfits a groove 13 formed in the upper portion of the punch 11 so as to lock the punch against withdrawal forces which are developed during the upward stroke of the ram of the conventional punch press (FIGURE 15). In order to form a bore to receive the ball and its compression spring 15, there is provided a slant bore 16 in the retainer block which is angularly related to the bore 17 which mounts the piercing punch.

In the present example, the slanted bore 16 for the locking ball 12 is delineated by a cylindrical core rod 18 (FIGURE 3) which passes downwardly through the upper ram 20 and through the upper punch assembly 10. The upper end of the core rod 18 intercepts the male pilot 21, which forms the mounting bore for the piercing punch. For this purpose, the lower end of the core rod 18 is machined to snugly interfit the periphery of the male pilot 21. As a consequence, the angular bore 16, which is delineated by core rod 18 opens into the punch bore at completion of the compression stroke.

Figure 5:
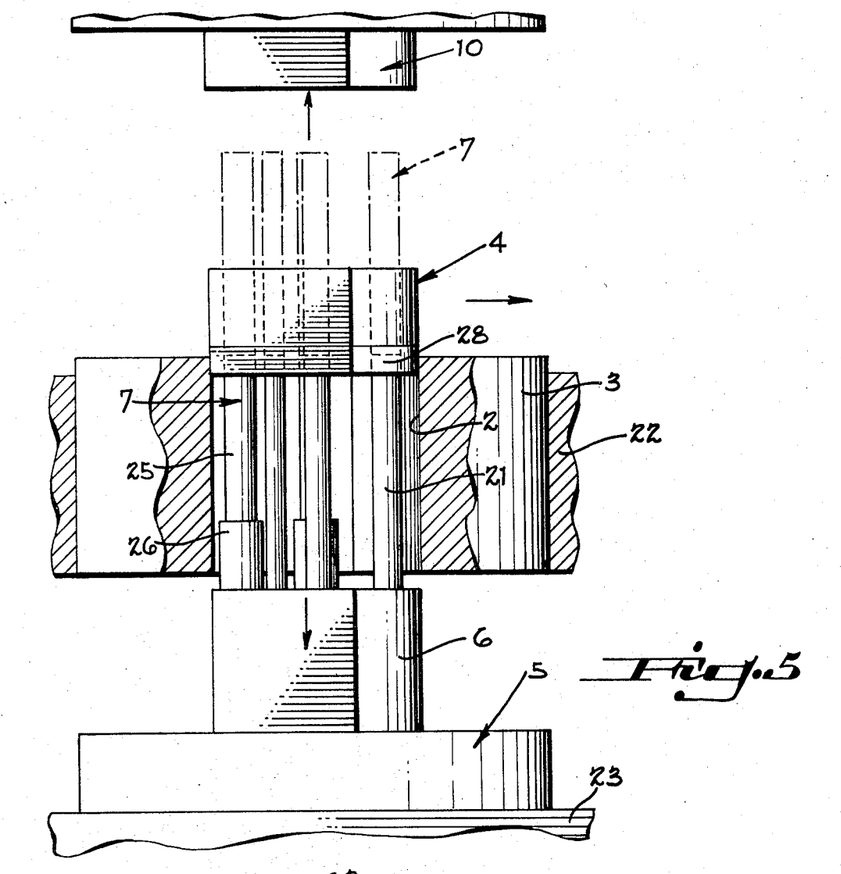
FIGURE 5 is a view generally similar to FIGURE 3 showing the compressed retainer block ejected from the matrix or holder and resting upon the stripper plate ready for removal from the holder.

As indicated by the arrow, the rod 18, which forms a core for the slanted ball hole 16, is inserted into the mold cavity independently along its slanted path during the compression stroke of the lower ram and lower punch assembly (FIGURE 1). The rod 18 thus forms a core for the angular bore during the compression stroke. At completion of the stroke, the rod 18 is withdrawn along its own axis (FIGURE 3) prior to the ejection stroke of the lower punch assembly, which is shown in FIGURE 5. As an alternate procedure, the core rod 18 may be formed of copper and infiltrated into the mass during the sintering process.

Figure 3:
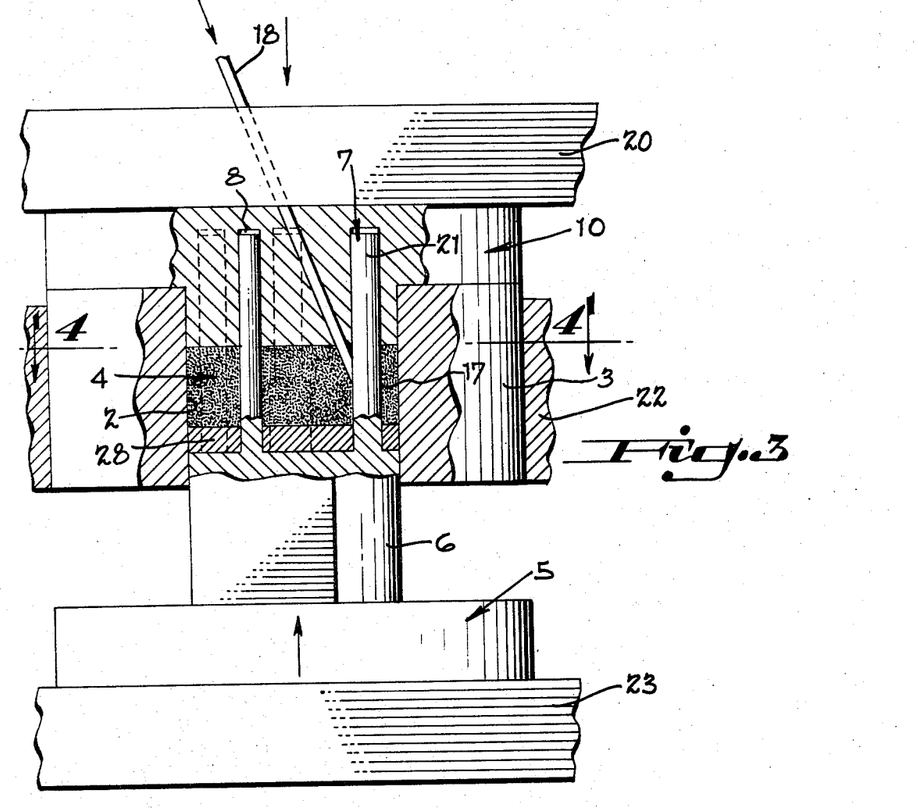
FIGURE 3 is a view similar to FIGURE 1 but showing the upper and lower punch assemblies in the positions which they assume at the end of the compression stroke with respect to the stationary matrix or holder.
Figure 4:
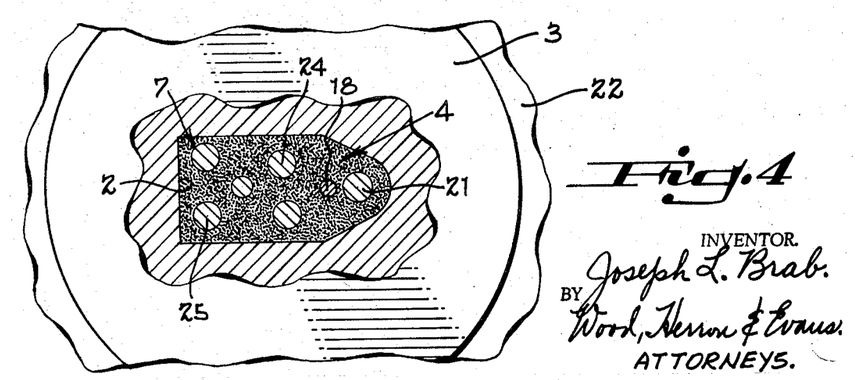
FIGURE 4 is a sectional view taken along line 4—4 of FIGURE 3, illustrating the compressed briquette or retainer block in the stationary matrix at the end of the compression stroke.

The holder 3 is mounted in a stationary position in a support plate, which is indicated generally at 22, which is mounted between the upper and lower rams 20 and 23 of a punch press, which move toward one another during the compression stroke. The double acting press may be of the mechanical or hydraulic type; however, since the press does not form a part of the present invention, it has been omitted from the present disclosure. In the present example, the press is of a type capable of imparting a pressure of approximately fifty tons p.s.i. upon the mass of powdered metal 1. In the present example, the upper and lower rams 20 and 23 (which mount the upper and lower punch assemblies 10 and 5), move toward one another as indicated in FIGURE 3 during the compression stroke. This compresses the powdered metal 1 from the condition shown in FIGURE 1 to the dense state shown in FIGURE 3.

In order to control the thickness of the retainer block 4, which is formed from the powdered metal, the strokke of the rams 20 and 23 of the press are regulated by means (not shown) which are conventional in the industry. It will be understood, at this point, that the quantity of the powdered metal 1, which is fed into the die cavity 2 at the start of the operation, is precisely measured in order that the density of the compressed retainer block or briquette 4 is controlled with precision.

As noted earlier, the powdered metal 1 contains a percentage of carbon, which is dissipated from the block during the sintering process. In practice, it has been found that the infiltration of copper, which amounts roughly to 20% of the total mass of the block, is due to the voids which are caused partially by degassing and expansion of the carbon and other elements during sintering, and partially due to the fact that it is impossible to primary cold compact the briquette to 100% density.

Figure 2:
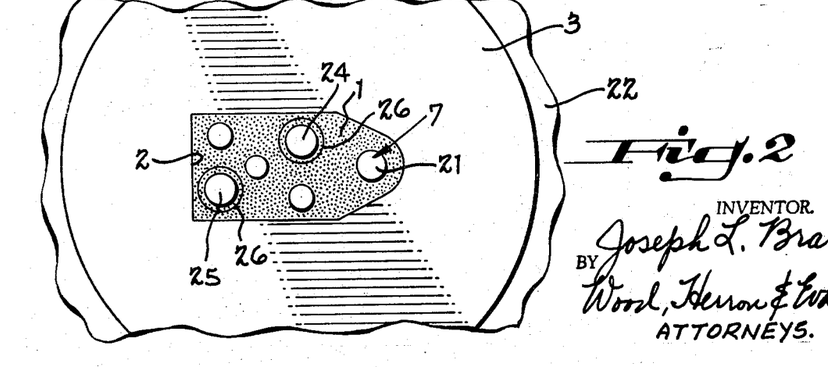
FIGURE 2 is a top plan view, taken along line 2—2 of FIGURE 1, further illustrating the die cavity which is formed in the stationary matrix or holder.
Figure 12:
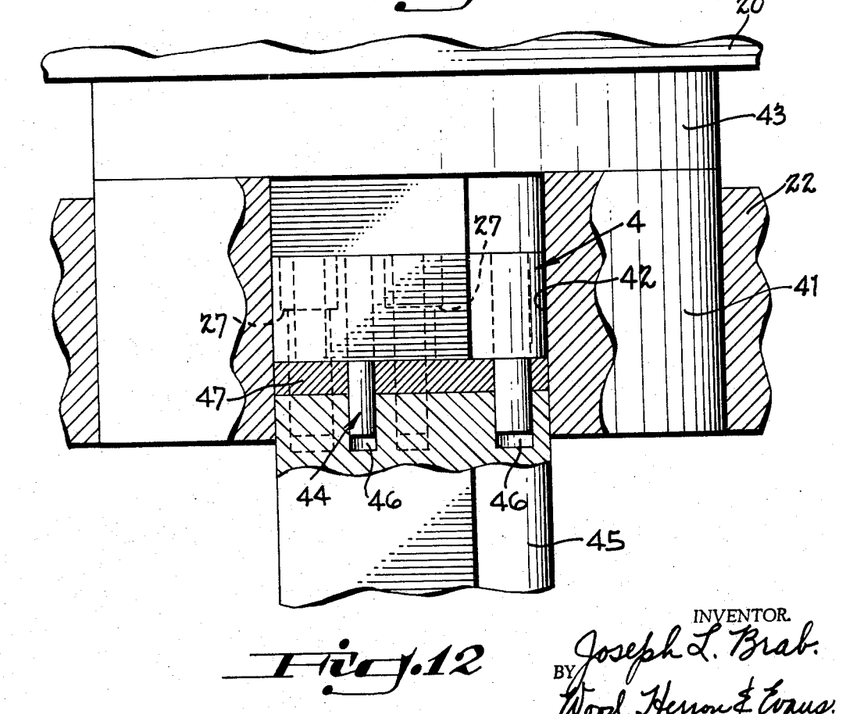
FIGURE 12 is a fragmentary side elevation, partially in cross section, showing the coining die set which imparts a high impact force upon the infiltrated retainer block to bring the outline configuration and bore holes of the block to more accurate dimensions after the sintering and copper infiltration treatments.

During the compression stroke (FIGURE 3), the pilots or male dies 7 enter the die apertures 8 to delineate the bore holes of the briquette or retainer block 4. In the form shown in FIGURE 2, two of the male dies or pilots 24 and 25 are provided with enlarged diameters at their lower ends as indicated at 26. These enlarged diameter portions 26 delineate counter bores 27 in the retainer block, as indicated in FIGURE 12.

It will be understood at this point, that, in the present example, the lower core element 6 is provided with a stripper plate 28 to aid in ejecting the compressed briquette from the die cavity or matrix 2 of holder 3. As shown in FIGURE 1 the stripper plate 28, during the loading operation, resides partially within the lower portion of the die cavity 2, with the powdered metal resting upon it. The stripper plate is provided with bores which interfit the male dies or pilots 7 and is removable from the lower core element 6.

After the compression stroke (FIGURE 3) the compressed retainer block 4 is ejected from the matrix or die cavity 2 by operation of the lower die assembly 5. To permit this operation, the upper ram 20 and its die assembly 10 is shifted to the elevated position after the compression stroke (FIGURE 5). Thereafter, the lower ram 23 and its core element 6 shifts upwardly, forcing the compacted retainer block 4 and the stripper plate 28 through the die cavity, as indicated by the broken lines in FIGURE 5. Thereafter, the lower die core element 6 retracts, as shown in full lines in FIGURE 5, leaving the stripper plate 28, with the retainer block 4 resting upon it, at the top of the holder 3. The compacted block is then removed and the stripper plate 28 is transferred back to the position of FIGURE 1 for the next compacting cycle.

SINTERING

After ejection from the cavity 2, the compressed retainer block 4 (or briquette) is advanced to a sintering furnace, of conventional design to be heated to a sintering temperature, which is sufficient to fuse the compressed mixture of powdered metal. By way of example, in treating the composition indicated above, the furnace may be operated at a temperature in the neighborhood of 2200° F.

At this temperature, traces of the powdered carbon, which forms a part of the mixture, practically dissipate; however, it has been found that the carbon acts as a catalyst which accentuates the reaction of the several components of the powdered metal. As noted above, the retaining block or briquette 4 is protected from oxidation in the sintering furnace by an atomsphere of hydrogen, helium or other gas, according to conventional practice. It will also be understood that the sintering furnace may be of the conveyor type, such that each retainer block or briquette 4 is treated at the same temperature and for the same duration so as to provide uniform results.

Figure 7:
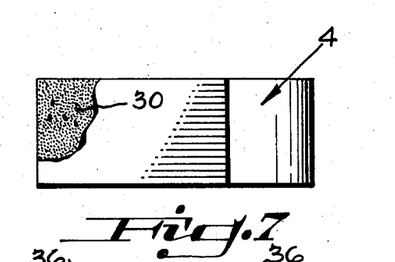
FIGURE 7 is a side elevation of the retainer block illustrated in FIGURE 6 after having been sintered.

After the sintering operation, the structure of the fused material comprises a mass of crystals having voids, which are indicated diagrammatically at 30 in FIGURE 7. These voids, as noted earlier, are caused in part by the dissipation of the carbon and partially by the inability to primary cold compact to 100% density. These voids subsequently are filled with copper, as explained later.

INFILTRATION

Figure 9:
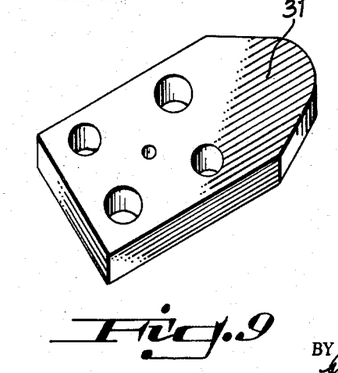
FIGURE 9 is a perspective view illustrating the copper slug after it has been ejected from the press.
Figure 10:
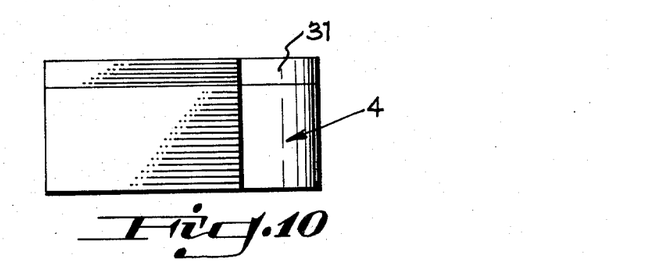
FIGURE 10 is a side elevation of the retainer block or briquette with the copper slug resting upon its top surface and ready to be fed into the infiltrating furnace.

After the sintering operation, the solidified retainer blocks 4 are discharged from the furnace. At this point, a plug of copper, as indicated at 31 (FIGURE 9), is placed upon the top surface of each block 4. The blocks 4 are then reheated to a temperature of 1950° F. minimum, or slightly above the melting point of the copper slug, as explained below. The copper slug, which is placed upon the top surface of the block, preferably is of the same configuration and is approximately one-fourth the total thickness of the retainer block 4, or other part which is being treated.

In the present example, the copper slug 31 is formed from powdered copper and preferably is compacted in the same double acting press, as is utilized in compacting the retainer block, as described earlier with reference to FIGURES 1–3. It will be understood that the stroke of the press necessarily is changed to compensate for the reduced thickness of the copper slug. The upper and lower core elements of the die sets are also modified, as explained below.

Figure 8:
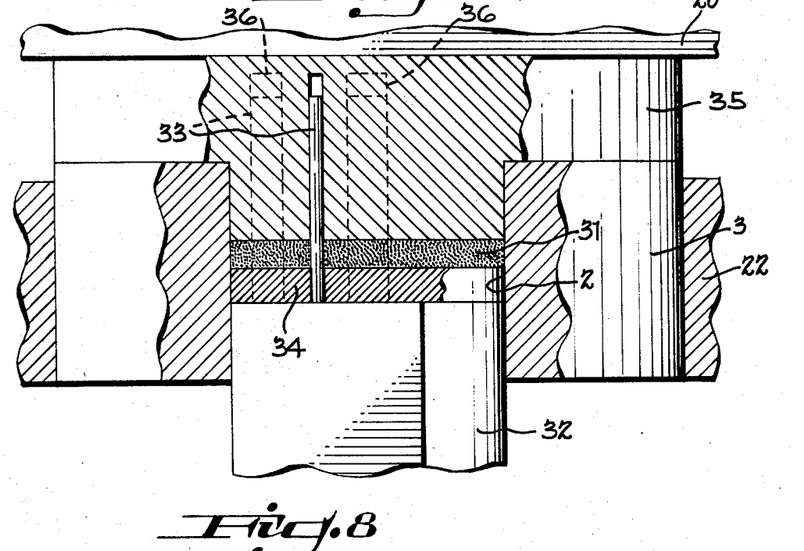
FIGURE 8 is a view generally similar to FIGURE 3, showing the dies which are utilized in compressing the copper slug in the matrix. This slug has the same outline configuration as the retainer block and is utilized in infiltrating the block after it has been sintered.

Thus, as shown in FIGURE 8, the proper amount of powdered copper zinc alloy is placed in the cavity or matrix 2 of the holder 3, with the upper and lower dies retracted to the open position, as shown in FIGURE 1. As viewed in FIGURE 9, several of the bore holes have been omitted from the copper slug; also the counter bores 27 are omitted. Accordingly, the modified lower core element 32 is provided with pilots 33 of modified design. The modified lower core element 32 also includes a stripper plate 34 which is modified to interfit the pilots 33.

The upper die core element 35 is provided with a pattern of die apertures 36 corresponding to the male pilots to receive the pilots during the compression stroke, as shown in FIGURE 8. After the compression stroke, the copper slug 31 is ejected from the die cavity or matrix 2 in the same manner as described with reference to FIGURE 5.

Figure 11:
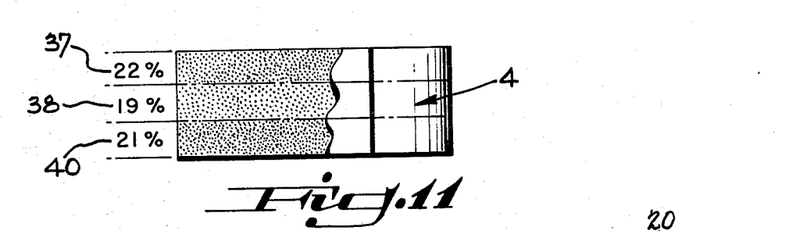
FIGURE 11 is a side elevation of the retainer block after having been infiltrated with the copper slug, showing the percentages of copper in the several zones of the retainer block.

The copper infiltration process may be carried out in the same furnace in which the block previously were sintered; however, the temperature necessarily is reduced, as indicated above. During passage of the retainer blocks through the furnace, with the copper slugs in place, the copper slugs 31 are fused and the copper, in a liquid state infiltrates the block 4 (FIGURE 11), thus imparting greater strength and density to the block. It has been found that the fused copper (slug 31) penetrates the entire mass of block 4 by gravity, as indicated in FIGURE 11. In the examples tested, the upper portion of the block contains approximately 22% copper, as indicated at 37, the central portion of the mass, indicated at 38 contains approximately 18% copper, and the lower area 40 of the block contains approximately 21% copper. In other words, the infiltration of copper alloy is substantially uniform throughout the entire mass of the block.

The reason for the percentage infiltration (FIGURE 11) is the differential in attained density in compacting zones 37, 38 and 40, which are attained for structural reasons in the primary cold compacting operation. Therefore, the infiltration will be proportionate to the density attained in the respective zones.

COINING

After the copper infiltration process, the retainer block 4 is allowed to cool then is placed in a die set adapted to provide a work hardening or coining treatment. The work hardening or coining die set (FIGURE 12) is generally similar to the die set which compresses the powdered metal, except that the die elements are modified and reversed in position. Thus, as viewed in FIGURE 12, a stationary work holder 41 having a cavity or matrix 42 is mounted in a support plate 22. The internal surface of the cavity 42 is hardened and is dimensioned to the final configuration which is to be imparted to the sintered retainer block 4.

Figure 6:
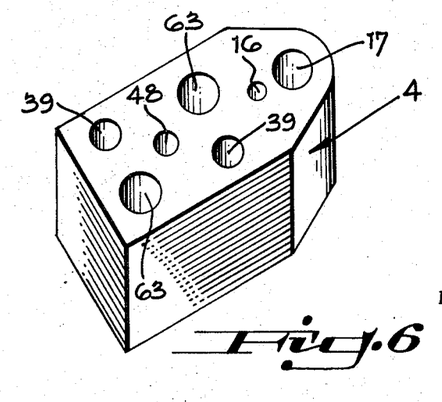
FIGURE 6 is a perspective view illustrating the retainer block after having been ejected from the matrix.

An upper core or coining punch 43 is mounted upon the upper ram 20 of a high impact die press. The upper coining punch 43 includes pilots 44 adapted to interfit the bore holes 39 which were previously formed in the block 4 (FIGURE 6). However, the pilots are precisely machined to bring the bore holes to their final diameter.

The lower coining die 45, is mounted on the lower ram 23 of the press (not shown in FIGURE 12) includes die apertures 46 to receive the lower ends of the pilots 44. A stripper plate 47 is placed upon the lower coining die to aid in ejecting the retainer block after the coining operation. The upper and lower rams 20 and 23 provide an impact force similar to the compression die set.

Briefly, the coining dies (FIGURE 12), which are precisely machined, impart a sizing or coining effect to the retainer block 4 so as to reduce the block closely to its final dimensions. The high impact force to which the cold block or briquette is subjected, also imparts a degree of surface hardness due to the coining action.

In the coining operation, the cooled, sintered retainer block is placed between the dies with the upper coining die elevated to a position similar to that shown in FIGURE 1, with the block supported upon the stripper plate. The coining dies are then closed to force the block into the cavity and to apply the impact force. As noted above, the interior surface of the die cavity 42 is machined to impart the outside dimensions to the retainer block. The mating male pilots and die aperture form the bore holes 39 to their final dimensions, with the exception of certain machining operations, which cannot be carried out in a punch press.

After the coining or work hardening, the retainer block 4 is forced upwardly from the die cavity by operation of the lower ram and coining die 45. The upper ram 20, with its die 43, is elevated after the coining stroke to permit ejection of the retainer block 4 from the die cavity. The coining operation is not intended and does not increase the structural strength of workpiece; it merely calibrates the part to its final dimension.

MACHINING

Figure 13:
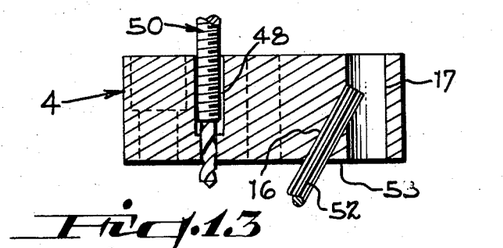
FIGURE 13 is a sectional view of the retainer block after the sintering and infiltrating operations, showing the final machining operations, such as tapping and reaming, which are employed to complete the fabrication.

After the coining operation, certain machining operations are necessary to complete the retainer block, as indicated in FIGURE 13. Thus, in the example selected, at least one of the bore holes 48 requires a drilling and tapping operation to receive the jack screws which are utilized in extracting the retainer block from its mounting plate (Patent 3,103,845). In the example illustrated, a combined drill and tap, indicated generally at 50 (FIGURE 13) is utilized. This tool is of conventional design. The slant bore 16 preferably is reamed to a precise dimension by the reamer 52. In addition, at least one side of the block, as indicated at 53, is machined to provide a precisely flat surface adapted to seat against the backing plate 54, as shown in FIGURE 15. After the machining operations, the finished block may be carburized or heat treated, as explained later.

Figure 14:
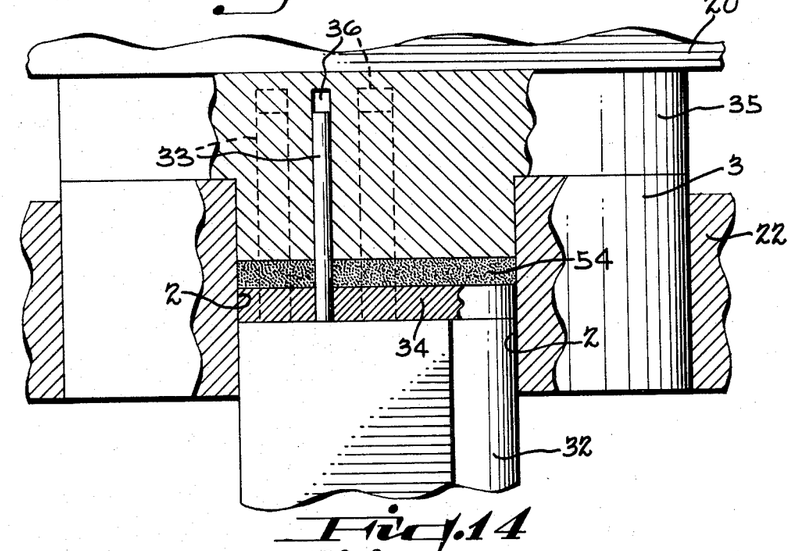
FIGURE 14 is a fragmentary side elevation, partially in cross section, generally similar to FIGURE 8, showing the compacting of the backing plate from powdered metal in a generally similar die set.

The backing plate 54 (FIGURES 14 and 15) is fabricated from powdered metal in the same manner as the retainer block, preferably utilizing the same press equipment with slightly modified dies. In other words, the backing plate is compacted, sintered, copper infiltrated, and coined as described above. Since the backing plate may require increased strength and toughness, the composition of the powdered metals and the resulting alloy may be modified slightly. Since the several operations are substantially the same as those already described, the details of fabrication with respect to the backing plate have been omitted from the disclosure.

CARBURIZING

After the sintering, infiltrating and coining treatments, the part has a high degree of physical strength, that is, hardness and toughness, for example, physical properties capable of resisting pressures of approximately 137,000 p.s.i. as compared to 106,000 p.s.i. achieved with 8620 AISI steel. In many instances, the parts, after the machining operations (FIGURE 13) may be used without the heat treatment, as indicated by extensive testing.

In the case of the die elements, such as the retainer block backing plate, punches and die buttons, which require a high degree of hardness and toughness, the parts, after the machining operation, are heat treated to provide a hardened case and to toughen the core structure of the mass. By way of example, the retainer block 4 may be carburized for approximately six hours at a temperature of 1800° F. then quenched in oil. This operation may be carried out by packing the parts in protective containers in the presence of carbon or by heat treating in the presence of protective gas or special liquids, according to conventional practice.

It has been found that in heat treating parts fabricated from powdered metal, according to this invention, there is practically no deformation of the parts, especially with the alloys disclosed herein. In other words, the alloy is highly stable during heat treatment and is not subject to deformation, such as takes place during the heat treating of the various grades of steel, especially 8620. In other words no further machining operations are necessary to correct for deformation after the heat treating operation, whereas such corrective machining operations are commonly associated with the heat treatment of conventional grades of steel.

The following examples indicate the compositions of the various alloys following the sintering process but before partial or complete copper infiltration, which have been found to be particularly useful in fabricating the various die elements:

*Example 1*

An alloy particularly adapted for the fabrication of the retainer block 4 and backing plate 54, requiring a high degree of case hardness and core toughness is as follows:

|  | Percent (approx.) |
|---|---|
| Iron | 75 |
| Copper | 23–25 |
| Nickel | .35 |
| Molybdenum | .75 |
| Silicon | .25 |
| Manganese | .40 |

*Example 2*

Several alloys which are also useful in the fabrication of the retainer block and other die elements are as follows:

|  | Percent (approx.) |
|---|---|
| Electrolytic Iron | 92 |
| Nickel | 7 |
| Copper | 1 |

*Example 3*

| Iron | 95 |
|---|---|
| Nickel | 4 |
| Copper | 1 |

*Example 4*

| Iron | 98 |
|---|---|
| Molybdenum | 1.10 |
| Manganese | .60 |
| Silicon | .30 |

Alloys which are used in the fabrication of punches, die buttons and other parts which are subjected to high impact forces and which require a high degree of hardness and toughness are as follows:

*Example 5*

|  | Percent (approx.) |
|---|---|
| Iron | 75 |
| Copper | 23–25 |
| Nickel | .35 |
| Molybdenum | .75 |
| Silicon | .25 |
| Manganese | .40 |

*Example 6*

|  | Percent (approx.) |
|---|---|
| Iron | 98 |
| Molybdenum | 1.20 |
| Manganese | .60 |

Other alloys for parts of this general nature are as follows:

*Example 7*

|  | Percent (approx.) |
|---|---|
| Iron | 86 |
| Silicon | .45 |
| Manganese | .24 |
| Chrome | .070 |
| Molybdenum | 10 |
| Tungsten | 1.8 |
| Vanadium | 1.20 |

*Example 8*

| Iron | 92 |
|---|---|
| Carbon | .44 |
| Silicon | .23 |
| Manganese | .12 |
| Sulphur | .021 |
| Phosphorus | .010 |
| Chrome | .04 |
| Molybdenum | 5 |
| Tungsten | .80 |
| Vanadium | .60 |

Referring to FIGURE 15, the finished retainer block 4 is shown mounted upon a punch mounting plate 57, combined with the backing plate 54, which is interposed between the surface of the mounting plate and retainer block. The mounting plate is attached to the ram of a punch press (not shown). The die button (not shown), which coacts with the punch 11, usually is carried upon the stationary platen of the punch press in a die pad (not shown). As noted earlier, the backing plate 54 is designed to resist the pressure which is imposed upon the punch 11 during the punching stroke. The ball 12 resists the withdrawal forces which tend to pull the punch from the retainer block 4 during the withdrawal stroke of the ram.

The retainer block is located precisely in position with respect to the mounting plate 57 by dowel pins 58, which are rigidly press fitted into the mounting plate and which provide a light press fit with respect to the bores 39 of the retainer block. The backing plate 54 is secured to the retainer block by a cap screw 60, the head of which engages the shoulder provided by the counter bore 48. The threaded portion 61 of the bore hole 48 provides engagement for the jack screw which is threaded into the bore holes after removal of the cap screw 60 to extract the retainer block from the mounting plate.

The retainer block is attached to the mounting plate 57 by relatively large mounting screws 62 which pass through the bore holes 63 and into threaded engagement with the mounting plate 57.

The retainer block assembly (FIGURE 15) is intended to be mounted in clusters on the mounting plate 57, with the retainer blocks in close proximity to one another to provide the required pattern of holes. The die buttons are mounted in a die pad or plate and are located on centers precisely aligned with the axes of the punches. The threaded bore 61 permits threading in of the jack screw to permit convenient removal of any one of the retainer block assemblies for removal and replacement of a broken or worn punch.

Having described my invention I claim:

1. The process of producing a die element from powdered metal comprising the following steps:

provilding a stationary holder having a die cavity configurated to delineate the external configuration of the die element;
providing at least one shiftable core element which is configurated to slidably interfit said die cavity;
placing in said die cavity a measured quantity of mixed powdered metal sufficient to form the die element and consisting essentially of 90 to 95 percent by weight powdered iron, 4 to 7 percent powdered copper, and 1 to 3 percent powdered carbon;
forcing said core elements into the die cavity until a pressure of at least 50 tons p.s.i. is developed, thereby to compact the powdered metal to the form of a briquette having less than 100 percent density, leaving 10 to 15 percent voids in the mass of the compacted die element;
removing said compacted die element from said die cavity;
placing in said die cavity a measured quantity of powdered copper which is equal to from 20 to 25 percent of the quantity of powdered metal which forms the compacted die element;
forcing the die element progressively into the die cavity until a pressure of at least 50 tons p.s.i. is developed, thereby to compact the powdered copper to the form of a substantially solid copper slug having an external configuration corresponding to the external configuration of the compacted die element and having a thickness equal to 20 to 25 percent of the thickness of the compacted die element;
sintering the compacted die element in a sintering furnace at a temperature between 2000° F. and 2200° F. in a hydrogen atmosphere;
maintaining the compacted die element at said temperature for a period of 1 to 2 hours to fuse the compacted mixture of powdered metal and to dissipate the carbon, thereby to form additional voids in the mass of the sintered die element;
cooling the sintered die element gradually for a period of 1 to 2 hours;
placing said copper slug upon the top surface of the sintered and cooled die element;
heating the sintered die element with the copper slug thereon to a temperature between 1950° F. and 2000° F. in a hydrogen atmosphere;
and maintaining the die element at said temperature for a period of 1 to 2 hours, whereby the copper slug is melted and caused to infiltrate uniformly throughout the mass the voids previously formed in the sintered die element.

2. The process of producing from powdered metal a die element having at least one cylindrical bore extending therethrough comprising the following steps:

providing a stationary holder having a die cavity configurated to delineate the configuration of the die element;
providing an upper and a lower shiftable core element which are configurated to slidably interfit the die cavity from opposite sides;
said lower core element including at least one pilot element projecting upwardly for delineating the cylindrical bore in said die element;
placing in said die cavity upon said lower die element measured mass of mixed powdered metal to form the die element and consisting essentially of 90 to 95 percent by weight powdered iron, 4 to 7 percent powdered copper and 1 to 3 percent carbon;
forcing said upper and lower core elements toward one another into the die cavity until a pressure of at least 50 tons p.s.i. is developed, thereby to compact the powdered metal to the form of a briquetts having less than 100 percent density, leaving voids constituting from 10 to 15 percent of the mass of the compacted die element, the compacted die element having a cylindrical bore which is delineated by said pilot element;
removing the compacted die element from the die cavity;
placing in said die cavity a quantity of powdered copper equal to between 20 and 25 percent of the quantity of the mixture of powdered metal which forms the compacted die element;
forcing said upper and lower die elements toward one another into the die cavity until a pressure of at least 50 tons p.s.i. is developed, thereby to compact the powdered copper to the form of a substantially solid copper slug having an external configuration corresponding to the external configuration of the compacted die element, the copper slug having a cylindrical bore delineated by said pilot element and having a thickness equal to 20 to 25 percent of the thickness of the compacted die element;
removing the copper slug from the die cavity;
sintering the compacted die element in a sintering furnace at a temperature between 2000° F. and 2200° F. in a hydrogen atmosphere;
maintaining the compacted die element at the said temperature for a period of between 1 and 2 hours to fuse the compressed mixture of powdered metal and to dissipate the carbon, thereby to form additional voids in the mass of the sintered die element;
cooling the sintered die element gradually for a period of 1 to 2 hours;
placing the copper slug upon the top surface of the sintered and cooled die element;
heating the sintered die element with the copper slug thereon to a temperature between 1950° F. and 2000° F. in atmosphere of hydrogen;
and maintaining the die element at said temperature for a period of between 1 and 2 hours, whereby the copper slug is melted and caused to infiltrate uniformly throughout the mass the voids previously formed in the sintered die element.

3. The process of producing a die element from powdered metal comprising the following steps:

providing a stationary holder having a die cavity configurated to delineate the external configuration of the die element;
providing at least one shiftable core element which is configurated to slidably interfit said die cavity;
placing in said die cavity a measured quantity of mixed powdered metal sufficient to form the die element and consisting essentially of 85 to 95 percent by weight powdered iron, 4 to 10 percent powdered copper, and 1 to 5 percent powdered carbon;
forcing said core element into the die cavity until a pressure of at least 50 tons p.s.i. is developed, thereby to compact the powdered metal to the form of a briquette having less than 100 percent density and having voids constituting 10 to 15 percent of the mass of the compacted die element;
removing said compacted die element from said die cavity;
placing in said die cavity a measured quantity of powdered copper which is equal to from 20 to 25 percent of the quantity of powdered metal which forms the compacted die element;
forcing the die element into the die cavity until a pressure of at least 50 tons p.s.i. is developed, thereby to compact the powdered copper to the form of a substantially solid copper slug having a thickness equal to 20 to 25 percent of the thickness of the compacted die element;
sintering the compacted die element in a sintering furnace at a temperature between 2000° F. and 2200° F. in a hydrogen atmosphere and maintaining said temperature for a period of 1 to 2 hours to fuse the compacted mixture of powdered metal and to dissipate the carbon, thereby to form additional voids in the mass of sintered die element;

cooling the sintered die element gradually for a period of 1 to 2 hours;

placing said copper slug upon the top surface of the sintered and cooled die element;

heating the sintered die element and copper slug to a temperature between 1950° F. and 2000° F. in an atmosphere of hydrogen;

maintaining the die element at said temperature for a period of 1 to 2 hours, whereby the copper slug is melted and caused to infiltrate the voids previously formed in the sintered die element;

providing a work hardening die set including a stationary work holder having a work hardening die cavity configured to impart the final dimensions to the sides of the die element;

providing upper and lower shiftable work hardening core elements which are configured to slidably interfit the die cavity, said lower die element normally residing in a position spaced below the surface of the holder;

placing said infiltrated die element upon the upper surface of the lower work hardening core element;

forcing said lower core element and the die element upwardly into the work hardening die cavity under a thrust pressure of at least 50 tons p.s.i., thereby to impart a work hardened external surface to the sides of the die element;

and continuing the application of force to said core element until said core elements are forced against the upper and lower surfaces of the die element under a pressure of at least 50 tons p.s.i. to work harden the same;

and removing said work hardened die element from the die cavity by shifting said lower core element upwardly through said die cavity with the die element thereon.

References Cited
UNITED STATES PATENTS

| | | | |
|---|---|---|---|
| 1,940,294 | 12/1933 | Calkins | 75—200 X |
| 1,951,174 | 3/1934 | Simons | 75—208 X |
| 1,988,861 | 1/1935 | Thorausch | 75—211 X |
| 2,275,420 | 9/1942 | Clark et al. | 76—107 X |
| 2,402,120 | 6/1946 | Boegebold | 75—222 X |
| 2,778,742 | 1/1957 | Shipe | 29—182.1 X |
| 2,789,901 | 4/1957 | Shipe | 75—200 X |
| 2,827,407 | 3/1958 | Carlson | 148—126 |

FOREIGN PATENTS

| | | |
|---|---|---|
| 476,405 | 8/1951 | Canada. |
| 468,518 | 7/1937 | Great Britain. |
| 571,128 | 8/1945 | Great Britain. |

OTHER REFERENCES

Pettibone: "Copper Infiltrated Iron Compacts," PMM, July 1963, pp. 41–43.

CARL D. QUARFORTH, *Primary Examiner.*

BENJAMIN R. PADGETT, *Examiner.*

A. J. STEINER, *Assistant Examiner.*